United States Patent
Masui et al.

(10) Patent No.: US 6,917,859 B2
(45) Date of Patent: Jul. 12, 2005

(54) FACILITY MANAGEMENT SYSTEM AND FACILITY MANAGEMENT METHOD

(75) Inventors: Hirotaka Masui, Tokyo (JP); Takashi Ikeda, Tokyo (JP); Masafumi Ando, Tokyo (JP); Shinji Hattori, Tokyo (JP); Shigeo Takata, Tokyo (JP); Hidesuke Hayakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/330,116

(22) Filed: Dec. 30, 2002

(65) Prior Publication Data

US 2003/0144872 A1 Jul. 31, 2003

(30) Foreign Application Priority Data

Jan. 29, 2002 (JP) ........................................ 2002-020482

(51) Int. Cl.[7] .............................................. G05D 11/00
(52) U.S. Cl. ........................ 700/286; 700/275; 700/295
(58) Field of Search ............................. 700/9, 22, 108, 700/286, 203; 705/7; 717/127

(56) References Cited

U.S. PATENT DOCUMENTS

| 4,918,615 A | * | 4/1990 | Suzuki et al. ................ 700/275 |
| 6,178,362 B1 | * | 1/2001 | Woolard et al. ............. 700/295 |
| 2002/0004785 A1 | * | 1/2002 | Schull ........................ 705/51 |

FOREIGN PATENT DOCUMENTS

| JP | 11-264595 | 9/1999 |
| JP | 2001-222602 | 8/2001 |

* cited by examiner

*Primary Examiner*—Leo Picard
*Assistant Examiner*—Carlos R. Ortiz
(74) *Attorney, Agent, or Firm*—Oblon, Spivak, McClelland, Maier & Neustadt, P.C.

(57) ABSTRACT

An owner concludes with a facility maintenance company a contract for maintenance of electric facilities and an operation control monitor device installed in a building of the owner. The electric facility manufacturer gives the company permission to access the device from a terminal through the Internet as a communication network. The company receives continuous monitor data items of the electric facilities collected by the device. The manufacturer accesses the device from a terminal through the network and also receives the continuous monitor data items of the electric facilities.

20 Claims, 4 Drawing Sheets

FACILITY MANAGEMENT SYSTEM AND FACILITY MANAGEMENT METHOD

BACKGROUND OF THE INVENTION

1. Field of the Invention

The present invention relates to a facility management system and a facility management method for maintaining and inspecting electric facilities such as an air conditioning system installed in a building.

2. Description of the Related Art

FIG. 4 is a diagram showing a conventional facility management system. In FIG. 4, reference number 100 designates an owner of a building, 110 denotes one or more electric facilities installed in the building of the owner 100, 130 indicates an operation controller for controlling the entire operation of the electric facilities 110, and 120 designates an operation monitor device for monitoring the operation of the electric facilities 110 and transmitting monitor data items to outside.

Reference number 200 designates a facility maintenance company performing the maintenance and inspection for the electric facilities 110 installed in the building of the owner 100, and 210 denotes a remote monitor equipment installed in the facility maintenance company 200 for receiving the monitor data items transmitted from the operation monitor device 120 and detecting abnormal state of the electric facilities 110. Reference number 300 denotes an electric facility manufacture for manufacturing the electric facilities 110 and the operation controller 130 and selling them to the owner 100 of the building through a distributor (or through the facility maintenance company 200, for example), and 40 indicates a public telephone network connected to the operation monitor device 120 and the remote monitor equipment 210.

In the facility management system, in general, a plurality of the electric facilities 110 such as an air conditioning system are installed in each room and each floor in the building. The operation controller 130 controls the entire operation of the electric facilities 110. Because the electric facility manufacture 300 manufactures the electric facilities 110 and the operation controller 130, the electric facilities 110 have inherent communication protocols for controlling the operation thereof.

In general, because the facility maintenance company 200 maintains the operation monitor device 120 and the remote monitor device 210, where the operation monitor device 120 monitors the operation state of the electric facilities 110 and transmits the monitor data items through the communication network 40 and the remote monitor device 210 receives the monitor data items, the facility maintenance company 200 uses the inherent communication protocols between the operation monitor device 120 and the remote monitor device 210. Accordingly, in general, the communication protocols between the electric facilities 110 and the operation controller 130 manufactured by the electric facility manufacture 300 are different from the communication protocols between the operation monitor device 120 and the remote monitor device 210 supplied by the facility maintenance company 200.

Next, a description will now be given of the operation of the conventional facility management system.

The owner 100 of the building concludes a contract with the facility maintenance company 200 in order to install the electric facilities 110 manufactured by the electric manufacture 300 and the operation controller 130 in the building and to perform the fast maintenance, inspection and repairing of the electric facilities 110. Based on the contract with the owner of the building for maintenance, the facility maintenance company 200 installs the operation monitor device 120, to be connected to the communication network 40, in the building of the owner 100 and also installs the remote monitor device 210 in the facility maintenance company 200.

The operation controller 16 installed in the building of the owner 100 controls the entire operation of the electric facilities 110. The operation monitor device 120 always monitors the operation state of the electric facilities 110 controlled by the operation controller 130 and sends the monitor data items of the electric facilities 110 to the remote monitor device 210 installed in the facility maintenance company 200 through the communication network 40.

The remote monitor device 210 in the facility maintenance company 200 always monitors the monitor data items transmitted from the operation monitor device 120. When the monitor data items received exceed a corresponding predetermined normal range, the remote monitor device 210 generates and transmits abnormal information to the operation controller 130 through the communication network 40. Further, the remote monitor device 210 informs to the owner through the operation monitor device 120 a risk of occurrence of defects in the electric facilities 110 and the term to replace one or more system components forming the electric facilities 110 with new one.

Moreover, the facility maintenance company 200 settles the maintenance cost based on the contract and makes the inspection and repairing of the electric facilities 110 according to demand based on the monitor data items received by the remote monitor device 210, and if possible, settles the inspection and repairing cost from the owner 100 of the building.

Further, when the defect factor of the electric facilities 110 is unknown, the facility maintenance company 200 transmits the received monitor data items to the electric facility manufacture 300 in order to analyze the monitor data items by the manufacture 300. The electric facility manufacture 300 analyzes the monitor data items received, specifies a defect in the electric facilities 110 and reports the results of the analysis to the facility maintenance company 200. If possible, the electric facility manufacture 300 settles the analysis cost from the facility maintenance company 200.

Further, when the facility maintenance company 200 specifies the defect based on the monitor data items received by the remote monitor device 210, but cannot repair it, the facility maintenance company 200 offers the repairing to the electric facility manufacture 300. When receiving the offer for repairing, the electric facility manufacture 300 repairs the defect in the electric facilities 110 and settles the repairing cost from the owner 100 of the building, if possible.

There is an effective settlement method based on a contract for maintenance disclosed in the Japanese patent publication number 2001-222602, for example. This method uses a maintenance identifying number in a contract for maintenance. The document of the contract for the maintenance is sold to a user with the cost corresponding to the cost necessary for the maintenance. The facility maintenance company 200 performs the maintenance using a database of a maintenance contract management based on an offer card and the maintenance contract identifying number sent from the user.

Because the conventional facility management system has the configuration described above, the owner 100 of the building must install the dedicated operation monitor device 120 in the building in order to obtain the fast maintenance for the electric facilities 110 by the facility maintenance company 200. This causes the increasing of the cost to introduce the dedicated operation monitor device 120 and also occurs a drawback that the facility maintenance company 200 cannot perform the fast repairing according to the content of the defect.

Further, in order to provide the fast maintenance for the electric facilities 110 to the owner 100 of the building the facility maintenance company 200 must develop the dedicated operation monitor device 120 and the remote monitor device 210 for the maintenance of the electric facilities 110 and also must install the remote monitor device 210 in the facility maintenance company 200. This causes the increase of the costs for the product development and the introduction of the remote monitor device 210. Further, the facility maintenance company 200 offers the analysis of the monitor data items (as operation data items) to the electric facility manufacture 300 according to the contents of the defect in the electric facilities 110. This case cannot provide the fast maintenance to the owner 100 of the building.

In addition, the electric facility manufacture 300 cannot get continuous operation data items (as monitor data items) of the electric facilities 110, namely the manufacture 300 gets only a fragment of the operation data items). The manufacture 300 thereby cannot get the entire quality information on the market including the life cycle information of the electric facilities 110 manufactured and sold.

Accordingly, it is difficult that the manufacture 300 provides the fast maintenance and the manufacture's responsibility to the owner 100 of the building when the defect happens in the electric facilities. Furthermore, the manufacture 300 cannot improve the electric facilities in a future product development using the quality information on the market. Still further, the conventional facility maintenance system has a drawback that it is difficult for the electric facility manufacture 300 to settle the maintenance cost of the electric facilities 110 form the facility maintenance company 200 or the owner 100.

Under the management using the maintenance contract identifying number involved in the contract for maintenance disclosed in the Japanese patent laid-open publication number JP-2002-222602, the contract between the maintenance operator (namely, the facility maintenance company 200) and the beneficiary (namely, the owner 100) can be established. But, when the maintenance operator is different from the maintenance circumstance provider (such as the electric facility manufacture 300), it is difficult to suppress the use of the maintenance environment by the maintenance operator (namely, the facility maintenance company 200) without warning. For example, the conventional facility management system has a problem in which it is difficult to protect and keep the correct benefit for the maintenance cost, the repairing cost and the cost to provide various information supplied by the maintenance circumstance provider such as the electric facility manufacture 300.

SUMMARY OF THE INVENTION

It is therefore an object of the present invention to provide a facility management system and a facility management method having following features:

(a) For an owner of a building it is possible to reduce the introduction cost of facilities or devices for use in the maintenance of electric facilities, and the owner of the building can receive the fast maintenance for the electric facilities installed in the building;

(b) For a facility maintenance company it is possible to reduce the cost necessary for developing and introducing facilities or devices for use in the maintenance of the electric facilities, and the facility maintenance company can provide the fast maintenance to the owner of the building;

(c) For an electric facility manufacture it is possible to keep the manufacture's responsibility to the owner of the building when defect occurs in the electric facilities; and (d) In the electric facility manufacture it is possible to reflect the quality information in the future development for the products and to settle the maintenance cost for the electric facilities with certainly.

In a facility management system according to the present invention, a facility maintenance company maintains electric facilities installed in a building of an owner using an operation control monitor device installed in the same building for controlling and monitoring operation of the electric facilities based on a contract concluded between the facility maintenance company and the owner of the building. In the system the facility maintenance company receives monitor data items of the electric facilities installed in the building. Those monitor data items are collected by the operation control monitor device through a terminal of the facility maintenance company after receiving of a permission to access the operation control monitor device. The terminal is connected to a network.

In a facility management system according to another aspect of the present invention, a facility maintenance company maintains electric facilities installed in a building of an owner using an operation control monitor device installed in the same building for controlling and monitoring operation of the electric facilities based on a contract concluded between the facility maintenance company and the owner of the building. In the system the electric facility manufacture gives an access permission to access the operation control monitor device from a first terminal installed in the facility maintenance company through a network so that the facility maintenance company receives monitor data items of the electric facilities collected by the operation control monitor device. The electric facility manufacture accesses the operation control monitor device from a second terminal installed in the electric facility manufacture through the network and receives the monitor data items of the electric facilities collected by the operation control monitor device.

In a facility management system according to another aspect of the present invention, a facility maintenance company maintains electric facilities installed in a building of an owner using an operation control monitor device installed in the same building for controlling and monitoring operation of the electric facilities based on a contract concluded between the facility maintenance company and the owner of the building.

In the system the electric facility manufacture gives access permission to access the operation control monitor device from a first terminal installed in the facility maintenance company through a network. The facility maintenance company receives monitor data items of the electric facilities collected by the operation control monitor device, from the first terminal through the network. The electric facility manufacture accesses the operation control monitor device from a second terminal installed therein through the network and receives the monitor data items of the electric facilities collected by the operation control monitor device.

Accordingly, the present invention has the effect for the facility maintenance company that it is possible to reduce the cost of the development of the devices and the cost of the introduction of the devices for maintenance, and possible to provide the fast maintenance to the owner of the building.

Still further, the present invention has the effect for the electric facility manufacture that it is possible to provide to the owner of the building the manufacture's responsibility speedily, also possible to reflect the quality information in the future product development, and also possible to settle the maintenance cost for the electric facilities from the owner or the facility maintenance company with certainly.

BRIEF DESCRIPTION OF THE DRAWINGS

Other objects, features and advantages of the present invention will become apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiments of the present invention.

Embodiment

Figure 1:
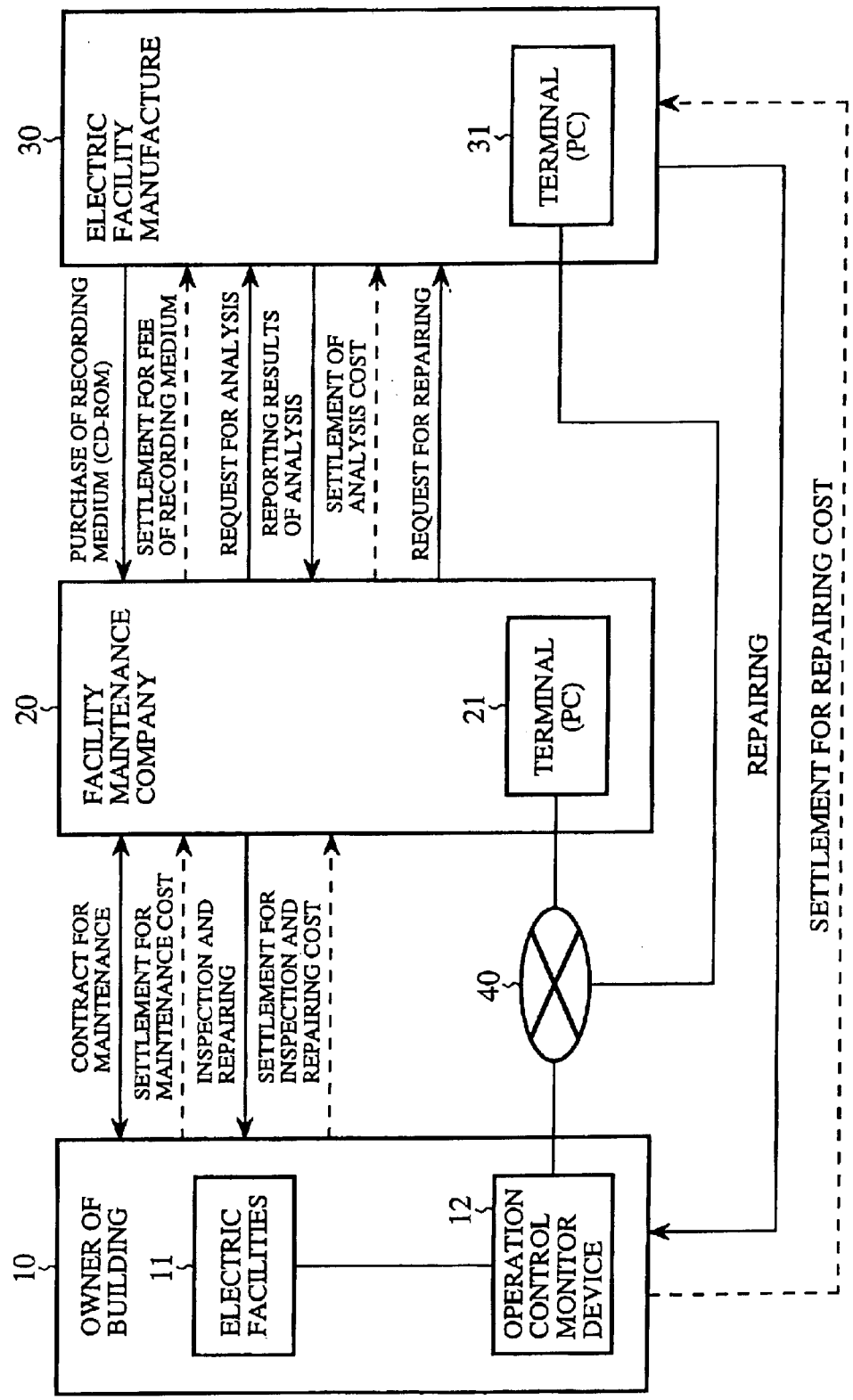
FIG. 1 is a diagram showing a configuration of a facility management system according to an embodiment of the present invention.

FIG. 1 is a diagram showing a configuration of the facility management system according to an embodiment of the present invention. In FIG. 1, reference number 10 designates the owner of a building, 11 denotes electric facilities such as an air conditioning system installed in the building of the owner 10. Reference number 12 indicates an operation control monitor device for controlling the entire operation of the electric facilities 11 and monitoring the operation state of the electric facilities 11 and collecting and transmitting monitor data items such as operation data items.

In FIG. 1, reference number 20 designates a facility maintenance company for performing the maintenance and inspection of the electric facilities 11 installed in the building of the owner 10. Reference number 21 denotes a terminal (as a first terminal) such as a personal computer installed in the facility maintenance company 20, 30 designates an electric facility manufacture for manufacturing the electric facilities 11 and operation control monitor device 12 and selling them to the owner 10 of the building through a distributing agent, and 31 indicates a terminal (as a second terminal) such as a personal computer installed in the electric facility manufacture 30. Reference number 40 designates a network of a public communication network such as a public telephone network, an electric transmission line network, a radio satellite communication network, and the Internet.

Although not shown in FIG. 1, communication devices such as a modem, a router and a terminal adopter are installed at the network of the operation control management device 12 and the terminals 21 and 31 connected to the communication network 40.

In the facility management system, the electric facilities are set in each floor and each room of the building. The operation control management device 12 controls the entire operation of a plurality of the electric facilities 11. The electric facility manufacture 30 manufactures the electric facilities 11 and the operation control monitor device 12. The operation control monitor device 12 has a function to convert inherent communication protocols for the electric facilities 11 to general-purpose communication protocols that are widely and commonly used in the field of the communication network 40.

A general-purpose personal computer (PC) is used as the terminal 21 installed in the facility maintenance company 20.

When obtaining the access right to access the operation control monitor device 12 from the electric facility manufacture 30, the facility maintenance company 20 can receive the monitor data items of the electric facilities 11 transmitted from the operation control monitor device 12 and perform the remote control for the electric facilities 11.

A general-purpose personal computer (PC) is also used as the terminal 31 installed in the electric facility manufacture 30. Through the communication network 40 the terminal 31 receives the monitor data items of the electric facilities 11 transmitted from the operation control monitor device 12 and performs the remote control for the electric facilities 11.

Next, a description will now be given of the operation of the facility management system and the facility management method according to the embodiment.

The owner 10 of the building concludes a contract with the facility maintenance company 20 in order to purchase and install in the building the electric facilities 11 and the operation control monitor device 12 manufactured by the electric facility manufacture 30, and to receive the fast maintenance, inspection and repairing of the electric facilities 11. In order to obtain the access right for accessing the operation control monitor device 12 based on the contract with the owner 10 of the building, the facility maintenance company 20 purchases a CD-ROM (Compact Disk Read Only Memory) as a recording medium from the electric facility manufacture 30.

The recording medium, such as the CD-ROM, stores following data items and programs executing functions in advance.

(1) Password and user ID (or customer's ID) corresponding to dedicated information stored in each operation control monitor device 12;

(2) Monitor program capable of:
  accessing the operation control monitor device 12 through the communication network 40;
  verifying coded password and coded user ID (in cipher) in order to permit or prohibit the execution of following programs;
  accessing the operation control monitor device 12 through the communication network 40 in order to obtain the monitor data items of the electric facilities;
  displaying them on the terminal 21; and
  verifying the monitor data items whether they are correct or not, (3) Remote control program for performing the remote control for the electric facilities 11 through the communication network 40 and the operation control monitor device 12;

(4) Operation manual for the electric facilities 11;

(5) Maintenance manual for the electric facilities 11; and
(6) Repairing manual for defects in the electric facilities 11.

The operation control monitor device 12 installed in the building of the owner 10 controls the entire operation of the electric facilities 11 and collects the monitor data items while always monitoring the continuous operation of the electric facilities 11.

Following data items are collected as the monitor data items in a case where each of the electric facilities 11 is an air conditioning system:

Operation modes for air cooling, air heating and air ventilating; a set temperature; a set data item such as a time schedule; a temperature data item for each device and each system component; a temperature data item for an air inlet; and an operation data item such as a pressure data item in a pipe.

The facility maintenance company 20 installs into the terminal 21 the monitor programs and the remote control program recorded in the recording medium such as the CD-ROM purchased and transmitting the password and the user ID corresponding to the operation control monitor device 12 in order to access the operation control monitor device 12 through the communication network 40. Thereby the facility maintenance company 20 can always receive the continuous monitor data items of the electric facilities 11 which are collected by the operation control monitor device 12.

The electric facility manufacture 30 installs the terminal 31 at the time when the manufacture 30 sold the electric facilities 11 and the operation control monitor device 12 to the owner 10 of the building. The monitor program and the remote control program, which are recorded in the recording medium such as the CD-ROM to be sold to the facility maintenance company 20, are installed in the terminal 31. Like the terminal 21 of the facility maintenance company 20, the electric facility manufacture 30 can access the operation control monitor device 12 through the terminal 31 and the communication network 40 and always gets the monitor data items collected of the electric facilities 11.

In a case where the electric facilities 11 is an air conditioning system, for example, the terminal 21 in the facility maintenance company 20 transmits abnormal information to the operation control monitor device 12 in order to inform a possibility of risk to occur a defect in the air conditioning system and the term for the replacement of the system components through the communication network 40 when the operation data items such as the obtained temperature and pressure data items of the components of each device in the air conditioning system exceed a corresponding predetermined normal range.

The terminal 21 detects the abnormal operation of the air conditioning system based on the operation data items such as the temperature set data and the temperature data at the air inlet, and then informs the occurrence of the abnormal state to the operation control monitor device 12 when the temperature detected at the air inlet of the air conditioning system is lower than the temperature set data in spite of the air heating operation mode, for example.

The facility maintenance company 20 settles the maintenance cost based on the contract for maintenance from the owner 10 of the building and performs the inspection and repairing of the electric facilities 11 based on the monitor data items obtained at the terminal 21 according to demand. The facility maintenance company 20, if possible, settles the inspection and repairing cost from the owner 10 of the building.

When the facility maintenance company 20 cannot specify a defect occurred in the electric facilities 11 although referring the repairing manual for defect recorded in the recording medium such as the CD-ROM using the monitor data items received through the terminal 21, the facility maintenance company 20 offers the analysis of the defect in the electric facilities 11 to the electric facility manufacture 30.

The electric facility manufacture 30 analyzes the monitor data items that are received through the terminal 31 and specifies the defect and informs the results of the analysis regarding the defect to the facility maintenance company 20.

In this case, the electric facility manufacture 30 can specify the defect because this manufacture 30 always monitors the continuous monitor data items through the terminal 31. The manufacture 30 settles the analysis cost from the facility maintenance company 20, if possible.

Further, the facility maintenance company 20 offers to repair the defect to the manufacture 30 when the company 20 cannot repair the defect even if specifying the defect. The electric facility company 30 repairs the defect in the electric facilities 11 and settles the repairing cost from the owner 10 of the building, if possible.

Next, a description will be given of the access right recognition procedure using the password corresponding to the operation control monitor device 12 between the terminal 21 of the facility maintenance company 20 and the operation control monitor device 12 in the building of the owner 10.

By performing this procedure, it is possible to prohibit any access without permission and the electric facility manufacture 30 can obtain the correct benefit of the maintenance.

Figure 2:
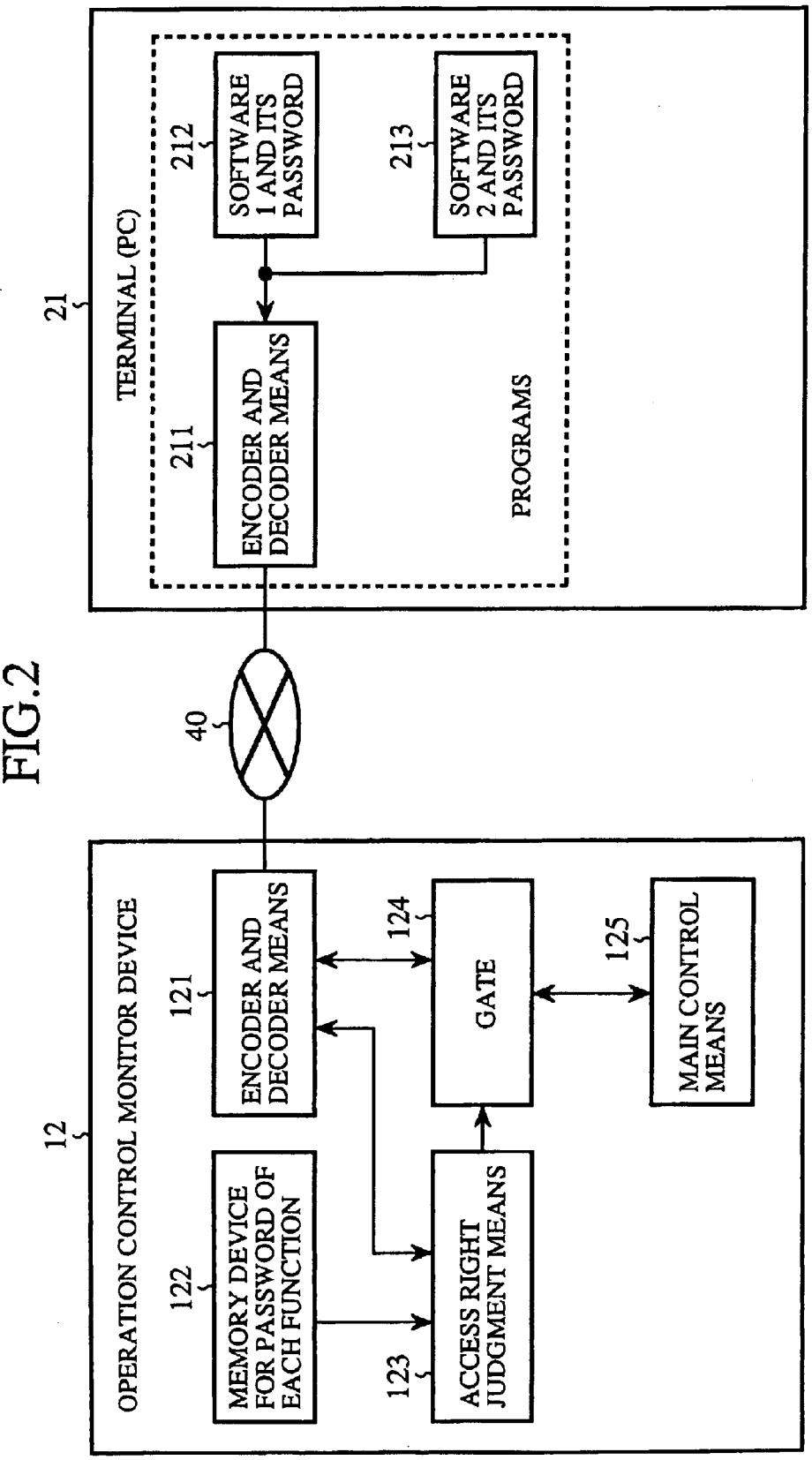
FIG. 2 is a diagram showing control blocks performing an access right recognition procedure in the facility management system.

FIG. 2 is a diagram showing control blocks in the facility management system for performing the access right recognition procedure. In FIG. 2, reference number 121 designates an encoder and decoder means, 122 denotes a memory means storing passwords corresponding to functions, 123 indicates an access right judgment means, 124 designates a gate and 125 denotes a main control means. The gate 124 has the function to permit and prohibit the access to the internal section of the main control means 125. Those means 121 through 125 are mounted in the operation control maintenance device 12. Reference numbers 211 through 213 indicate programs installed in the terminal 21. The program 211 designates an encoder and decoder means, the program 212 indicates a first software performing a first function and its password installed in the terminal 21. The program 213 denotes a second software performing a second function and its password installed in the terminal 21. Although not shown in FIG. 2, "n-th" software corresponding to the "n-th" function (where n=1, 2, . . . , and n) are installed in the terminal 21.

Figure 3:
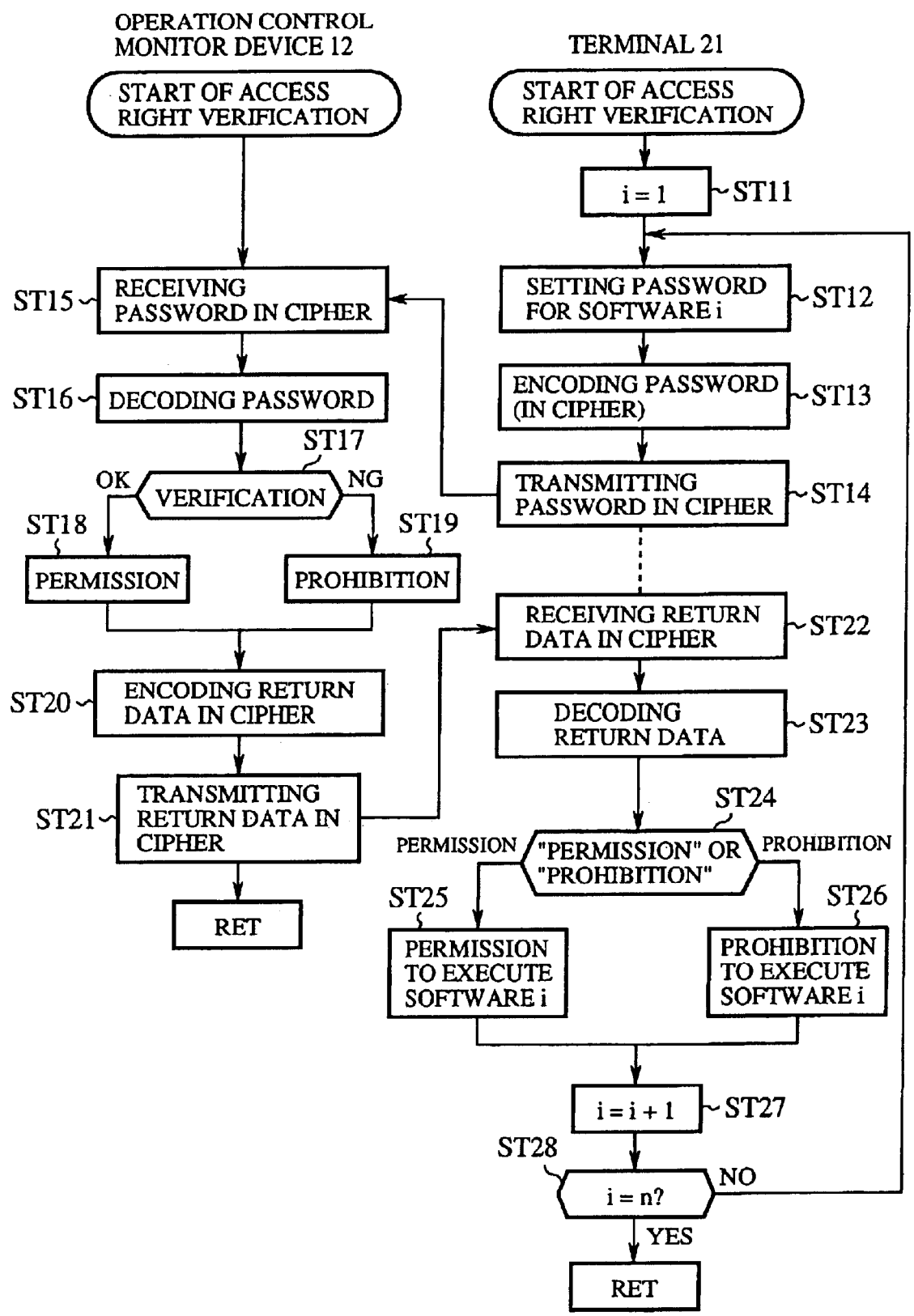
FIG. 3 is a flow chart showing the operation flow in the access right recognition procedure in the facility management system according to the embodiment of the present invention.

FIG. 3 is a flow chart showing the access right recognition procedure in the facility management system. The terminal 21 executes the steps ST11 through ST14 and Step ST22 through Step ST28. The operation control maintenance device 12 executes the Step ST15 through Step ST21.

In Step ST11, the variable "i" for the software is set to 1 (i=1), so that the first software (software "i" (=1)) is selected. In Step ST12, the password for the software "i" is read for transmission.

In Step ST13, the encoder and decoder means 211 encodes the password (in cipher) to be transmitted. In Step ST14, the terminal 21 transmits the password in cipher to the operation control monitor device 12.

In Step ST15, the operation control monitor device 12 receives the password in cipher. In Step ST16, the encoder and decoder means 121 decodes the password in cipher. In Step ST17, the access right judgment means 123 verifies the decoded password with the data stored in the function password memory means 122. When both are agreed to each other, the routine progresses to Step ST18, and when not agreed, the routine progresses to Step ST19.

In Step ST18, the operation control monitor device 12 prepares a reply data "permission." After this, when receiving the access from the terminal 21, the operation control monitor device 12 transmits this reply data "permission" to the terminal 21 in the facility maintenance company 20. When receiving the reply data "permission", the terminal 21 can pass through the gate 124 and then access the main control means 125.

In Step ST19, the operation control monitor device 12 prepares a reply data "prohibition." In Step ST20, the encoder and decoder means 121 prepares the reply data in cipher. In Step ST21, the operation control monitor device 12 transmits the reply data in cipher to the terminal 21 which offered to access the operation control monitor device 12.

In Step ST22, the terminal 21 receives the reply data in cipher. In Step ST23, the encoder and decoder means 211 decodes the reply data in cipher. In Step ST24, the terminal 21 checks whether the reply data indicates "permission" or "prohibition." When it is "permission", the routine progresses to Step ST25, and when "prohibition", the routine progresses to Step ST 26.

In Step ST25, the software "i" is executed. In Step ST26, the execution of the software "i" is prohibited.

In Step ST27, the variable "i" is updated by 1 ("i"="i"+1) and it is checked whether or not "i"=n. When "i"=n, the execution of the program "i" is completed. When not "i"=n, the routine progresses to Step ST12.

When the operation control monitor device 12 transmits this reply data "prohibition" to the terminal 21 in the facility maintenance company 20. When receiving the reply data "prohibition", the terminal 21 cannot pass through the gate 124 in the operation control monitor device 12.

Because the electric facility manufacture 30 should provide the proper password corresponding to each information stored in the operation control maintenance device 12 in formal purchase, it is judged whether or not each software in a plurality of the control and monitor software corresponding to each function to be installed in the terminal 21 has the access right in order to prohibit the use of the software without permission Although the above embodiment shows the air conditioning system as the electric facilities 11, it is possible to apply the present invention to an electric lighting fixture or other electric facility other than the air conditioning system.

In the embodiment described above, the facility maintenance company 20 performs the maintenance and inspection of the electric facilities 11. However, it is possible that the distributor who sold the electric facilities 11 and the operation control monitor device 12 to the owner 10 or the company 20 who sets up them in the building of the owner 10 may provide the maintenance and inspection for them instead of the facility maintenance company 20.

Furthermore, in the embodiment described above, although the facility maintenance company 20 maintains the electric facilities 11, it is possible to share the maintenance by a plurality of companies. In this case, each facility maintenance company purchases the recording medium such as the CD-ROM from the electric facility manufacture 30 and the terminal of each company is connected to the communication network 40.

Moreover, in the embodiment described above, it is possible to change the kinds of the programs such as the monitor program and remote control program stored in the recording medium, namely the CD-ROM, according to the contents of maintenance performed by the facility maintenance company 20 or according to the kinds of the monitor data items received, for example.

Further, in the embodiment described above, it is possible to increase the quality of the maintenance by adding new programs or updating the programs stored in the recording medium (the CD-ROM). The manufacture 30 sells this recording medium involving the new programs to the facility maintenance company 20 in order to increase the quality of maintenance.

Moreover, in the embodiment described above, although the operation control monitor device 12 controls the operation of the electric facilities 11 installed in the building of the owner 10, it is also possible for the facility maintenance company 20 or the electric facility manufacture 30 to control the operation of the electric facilities 11 according to the timing schedule determined by the owner 10 of the building through the terminal 21 or the terminal 31 after they receive the offer to change the timing schedule from the owner 10.

As described above, according to the embodiment, because the owner 10 of the building can introduce the operation control monitor device 12 having a combination of the function to control the operation of the electric facilities 11 and the function to collect the monitor data items and because the electric facility manufacture 30 can always obtain the continuous monitor data items, it is possible to reduce the entire cost necessary for introducing various control devices for the electric facilities 11 and the electric facility manufacture 30 can provide to the owner 10 the fast maintenance (specifying the defect and repairing it) even if the facility maintenance company 20 cannot specify or repair the defect.

Figure 4:
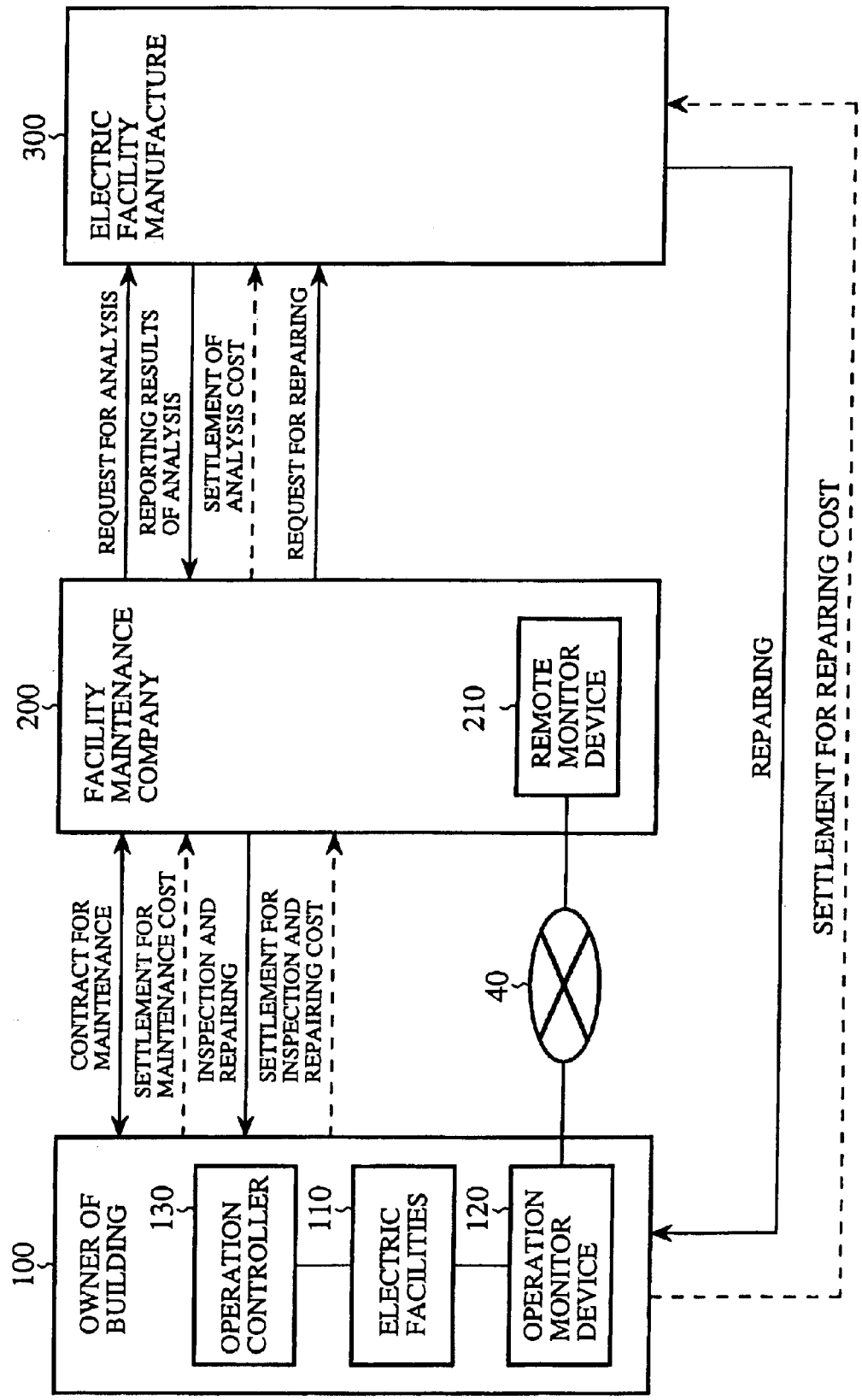
FIG. 4 is a diagram showing a configuration of a conventional facility management system.

In addition, according to the embodiment, the facility maintenance company 20 introduces only the terminal 21 such as a general-purpose personal computer and purchases only the recording medium such as the CD-ROM. This avoids the development cost of the maintenance program and the introduction cost of the maintenance devices and may provide the fast maintenance to the owner 10. On the contrary, in the conventional system, the facility maintenance company 200 has to introduce the remote monitor device 210 and the owner 100 has to introduce both the operation monitor device 120 and the operation control device 130 (see FIG. 4).

Further, the embodiment has the effect that the manufacture's responsibility for maintenance may be provided by always monitoring continuous monitor data items of the electric facilities 11 and the electric facility manufacture 30 can reflect the quality information of the maintenance into the future product development with certainty.

Still further, according to the embodiment, although it sometimes happens that the electric facility manufacture 30 hardly settles the maintenance cost for the electric facilities 11 and the cost to provide the repairing information and the cost to specify the defect caused in the electric facilities 11 from the owner 10 or the facility maintenance company 20, the embodiment has the effect that it is possible to settle the maintenance cost of the electric facilities 11 with certainly by selling to the facility manufacture company 20 the recording medium such as the CD-ROM by which the company 20 can use the facility management system.

As set forth detail, according to the present invention, there is the effect for the facility maintenance company that it is possible to reduce the development cost for devices and the introduction cost for the maintenance devices, and possible to provide the fast maintenance to the owner of the building.

According to the present invention, there is the effect for the electric facility manufacture that it is possible to provide to the owner of the building the manufacture's responsibility speedily, also possible to reflect the quality information in the future product development, and also possible to settle the maintenance cost of the electric facilities from the owner or the facility maintenance company with certainly.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A facility management system, comprising:

a building having electric facilities and an operation control monitor device installed therein; and a facility maintenance company configured to maintain the electric facilities installed in the building using the operation control monitor device installed in the building for controlling and monitoring operation of the electric facilities, wherein the facility maintenance company is configured to receive monitor data of the electric facilities in the building collected by the operation control monitor device through a terminal of the facility maintenance company connected to a communication network, after receiving permission from an electric facility manufacturer to access the operation control monitor device, and the terminal of the electric facility manufacturer is communicatively coupled to the communication network.

2. The facility management system according to claim 1, wherein the facility maintenance company transmits information of an abnormality to the operation control monitor device from the terminal of the facility maintenance company through the communication network when the monitor data received indicates an occurrence of the abnormality.

3. The facility management system according to claim 1, wherein the facility maintenance company is configured to control the operation of the electric facilities using the terminal of the facility maintenance company through the communication network and the operation control monitor device.

4. The facility management system according to claim 1, wherein:

the operation control monitor device is configured to convert a communication protocol for use in the electric facilities to a general-purpose communication protocol that is commonly used in the communication network, and the facility maintenance company uses a general-purpose personal computer as the terminal installed therein.

5. The facility management system according to claim 1, wherein the facility maintenance company receives through the terminal of the facility maintenance company, (1) setting data to operate the electric facilities, and (2) operation data obtained during the operation of the electric facilities, as the monitor data.

6. The facility management system according to claim 1, wherein the facility maintenance company is configured (1) to access the operation control monitor device through the communication network to obtain the monitor data of the electric facilities, (2) to display the monitor data on the terminal of the facility maintenance company, and (3) to obtain the permission to access the operation control monitor device after the facility maintenance company purchases from an electric facility manufacturer, a recording medium storing a monitor program for judging whether the monitor data received are normal or abnormal.

7. The facility management system according to claim 6, wherein the facility maintenance company receives the permission to access an individual operation control monitor device after obtaining a password stored in the purchased recording medium, wherein the password corresponds to information stored in the individual operation control monitor device.

8. The facility management system according to claim 7, wherein, before transmitting data including the password to verify the password with the information stored in the corresponding operation control monitor device, the facility maintenance company encodes the data including the password to be transmitted to prohibit access of the operation control monitor device by others without the permission.

9. The facility management system according to claim 6, wherein a remote control program is stored in the recording medium purchased by the facility maintenance company, the remote control program being configured to remotely control the electric facilities through the communication network and the operation control monitor device.

10. The facility management system according to claim 6, wherein the recording medium purchased by the facility maintenance company stores an operation manual, a maintenance manual, and a repairing manual for the electric facilities.

11. A facility management system, comprising:

a building having electric facilities and an operation control monitor device installed therein; and a facility maintenance company configured to maintain the electric facilities installed in the building using the operation control monitor device installed in the building for controlling and monitoring operation of the electric facilities, wherein an electric facility manufacturer gives permission to access the operation control monitor device to the facility maintenance company by a first terminal installed in the facility maintenance company through a communication network, so that the facility maintenance company receives monitor data of the electric facilities collected by the operation control monitor device through the communication network, and the electric facility manufacturer accesses the operation control monitor device by a second terminal installed in the electric facility manufacturer and receives the monitor data of the electric facilities collected by the operation control monitor device through the communication network.

12. The facility management system according to claim 11, wherein the electric facility manufacturer controls the operation of the electric facilities by the second terminal through the communication network and the operation control monitor device.

13. The facility management system according to claim 11, wherein the operation control monitor device is configured to convert a communication protocol for use in the electric facilities to a general-purpose communication protocol to be used in the communication network, and the electric facility manufacturer uses a general-purpose personal computer as the second terminal installed therein.

14. The facility management system according to claim 11, wherein the electric facility manufacturer receives setting data for use in the operation of the electric facilities and operation data during the operation as the monitor data by the second terminal installed therein.

15. The facility management system according to claim 11, wherein, in order to give the permission data to access the operation control monitor device, the electric facility manufacturer sells to the facility maintenance company a recording medium storing a monitor program for (1) accessing the operation control monitor device through the communication network, (2) receiving and displaying the monitor data of the electric facilities, and (3) judging whether the monitor data received are normal or abnormal.

16. The facility management system according to claim 15, wherein the electric facility manufacturer inserts into the recording medium to be sold to the facility maintenance company a password corresponding to an individual operation control monitor device, so that the facility maintenance company that purchases the recording medium obtains the permission to access the corresponding individual operation control monitor device.

17. The facility management system according to claim 15, wherein the electric facility manufacturer sells to the facility maintenance company a recording medium corresponding to a type of the monitor data received by the facility maintenance company.

18. The facility management system according to claim 15, wherein the electric facility manufacturer sells the recording medium having stored therein a remote control program for remotely controlling the electric facilities through the operation control monitor device and the communication network.

19. The facility management system according to claim 15, wherein the electric facility manufacturer sells the recording medium having stored therein an operation manual, a maintenance manual, and a repairing manual for the electric facilities.

20. A facility management system, comprising:

a building having electric facilities and an operation control monitor device installed therein; and a facility maintenance company configured to maintain the electric facilities installed in the building using the operation control monitor device installed in the building for controlling and monitoring operation of the electric facilities, wherein an electric manufacturer gives permission to access the operation control monitor device to the facility maintenance company by a first terminal installed in the facility maintenance company through a communication network, the facility maintenance company receives monitor data of the electric facilities collected by the operation control monitor device from the first terminal through the communication network, and the electric facility manufacturer is configured to access the operation control monitor device by a second terminal installed therein through the communication network, and to receive the monitor data of the electric facilities collected by the operation control monitor device.

* * * * *